United States Patent [19]

Kilgo et al.

[11] Patent Number: 6,037,539
[45] Date of Patent: Mar. 14, 2000

[54] HERMETIC ALUMINUM RADIO FREQUENCY INTERCONNECTION AND METHOD FOR MAKING

[75] Inventors: Riley D. Kilgo; Larry Kovacic, both of Albuquerque, N.Mex.; Richard K. Brow, Rolla, Mo.

[73] Assignee: Sandia Corporation, Albuquerque, N.Mex.

[21] Appl. No.: 09/045,235

[22] Filed: Mar. 20, 1998

[51] Int. Cl.⁷ .................................................. H01J 5/00
[52] U.S. Cl. ........................................................ 174/50.61
[58] Field of Search ............................ 174/50.61, 50.62; 428/426, 427, 432, 433

[56] References Cited

U.S. PATENT DOCUMENTS

| | | | |
|---|---|---|---|
| 2,555,877 | 6/1951 | Doran | 174/50.61 X |
| 2,866,713 | 12/1958 | Allen | 428/433 X |
| 2,948,992 | 8/1960 | Oldfield et al. | 428/433 X |
| 3,189,677 | 6/1965 | Anthony et al. | 174/50.61 |
| 3,676,292 | 7/1972 | Pryor et al. | 428/433 X |
| 3,685,005 | 8/1972 | D'Alessandro | 339/136 |
| 4,217,382 | 8/1980 | Toratani | 428/427 X |
| 4,349,635 | 9/1982 | Davis et al. | 174/50.61 X |
| 4,726,981 | 2/1988 | Pierson et al. | 428/427 X |
| 5,041,019 | 8/1991 | Sharp et al. | 439/559 |
| 5,104,755 | 4/1992 | Taylor et al. | 174/50.61 X |
| 5,109,594 | 5/1992 | Sharp et al. | 29/600 |
| 5,153,070 | 10/1992 | Andrus et al. | 428/427 X |
| 5,175,067 | 12/1992 | Taylor et al. | 174/50.61 X |
| 5,262,364 | 11/1993 | Brow et al. | 504/24 |
| 5,277,946 | 1/1994 | Nagai et al. | 428/427 X |
| 5,367,125 | 11/1994 | Viret | 174/52.4 |
| 5,843,853 | 12/1998 | Heitmann et al. | 428/427 X |

*Primary Examiner*—Dean A. Reichard
*Attorney, Agent, or Firm*—E. A. Klavetter

[57] ABSTRACT

The present invention provides a light-weight, hermetic coaxial radio-frequency (RF) interconnection having an electrically conductive outer housing made of aluminum or an aluminum alloy, a central electrical conductor made of ferrous or non-ferrous material, and a cylinder of dielectric material comprising a low-melting-temperature, high-thermal-expansion aluminophosphate glass composition for hermetically sealing between the aluminum-alloy outer housing and the ferrous or non-ferrous center conductor. The entire RF interconnection assembly is made permanently hermetic by thermally fusing the center conductor, glass, and housing concurrently by bringing the glass to the melt point by way of exposure to an atmospheric temperature sufficient to melt the glass, less than 540° C., but that does not melt the center conductor or the outer aluminum or aluminum alloy housing. The composition of the glass used is controlled to provide a suitable low dielectric constant so that an appropriate electrical characteristic impedance, for example 50 ohms, can be achieved for an electrical interconnection that performs well at high radio frequencies and also provides an interconnection maintaining a relatively small physical size.

14 Claims, 4 Drawing Sheets

HERMETIC ALUMINUM RADIO FREQUENCY INTERCONNECTION AND METHOD FOR MAKING

This invention was made with Government support under Contract No. DE-AC04-94AL85000 awarded by the Department of Energy. The Government has certain rights in the invention.

BACKGROUND OF THE INVENTION

This invention relates generally to a hermetically-sealed radio-frequency (RF) interconnection and method of making said interconnection, and, more particularly, to a hermetically-sealed, RF interconnection, feed-through or connector with an aluminum housing.

Typically, high reliability RF electronics circuits are packaged in hermetically-sealed steel housings to protect the circuits from corrosive environments and humidity. These sealed housings use electrical interconnections that are also hermetic that penetrate the housing and are needed to transfer electrical signals into and out of the housing. Hermetic RF feed-through interconnections are usually incorporated to transfer the high-frequency electrical signals. The RF interconnections generally comprise an electrically conductive center conductor, an outer electrically conductive housing, and an electrically insulating material, such as an insulating glass, hermetically sealed to the center conductor and the outer housing. These interconnections are typically manufactured from weldable stainless steels and high-melting-temperature, silicate-based, insulating glasses that require sealing temperatures above 900° C. RF interconnections installed into the hermetically-sealed housings are also typically made of weldable stainless steels. These hermetic packages are used in aerospace applications, such as communications satellites, microwave communications equipment, and military communications and radar systems which require a hermetic seal to avoid contamination of the RF devices inside. Being made of steel, these packages contribute to the heavy and undesirable weight of the final application assembly.

Electrical connectors and electrical housings made of an aluminum alloy, being of lighter weight, are preferred but have not been used for these hermetic assemblies because heretofore directly sealable and weldable, hermetic, RF interconnections with suitable electrical and chemical-durability properties joined with aluminum bodies could not be made. Previous RF interconnections have generally been made either with steel bodies or made with aluminum bodies with a transition joint made of steel between the insulating glass and the aluminum body. The transition joint is a seal typically made between steel or iron-nickel alloy rings and pins where the transition joint is made by explosively bonding a steel ring to an aluminum ring. A high-melting-temperature glass is used to seal to the inside of the steel ring. This sub-assembly is then welded into an aluminum housing assembly. The use of transition joints requires additional processing steps compared to the traditional manufacture of hermetic steel RF interconnections.

Sharp et al., in U.S. Pat. Nos. 5,041,019 and 5,109,594, issued on Apr. 20, 1991 and May 5, 1992, respectively, describe an electrical connector that utilizes a transition joint where a layer of steel is explosively bonded to a layer of aluminum, thus enabling a connector to be made that has substantially an aluminum-alloy body. These inventions are hermetically sealed transition joints for use with a microwave package. The inventions are seals between steel or iron-nickel alloy rings and pins. These seals are then explosively bonded to an aluminum ring, which is then welded into the aluminum package. Electronic signals are allowed to enter and exit the package via pins contained within the feed-throughs and power connectors. The feed-throughs contain a pin of desired metal surrounded by a bead of glass which is surrounded by a layer of cold rolled steel, stainless steel and/or iron-nickel alloy. This layer is laser-welded to a second layer of an aluminum alloy. The pin serves as an electrical connection to communicate with the electronic circuit inside the package. The glass provides electrical isolation between the pin and the package. Manufacture of these connectors with transition joints requires additional processing steps for making the steel-to-aluminum joint compared to connectors where the glass is directly attached to a steel or aluminum package. Moreover, the designed package is a microwave package and is not designed for RF applications, where the impedance must be closely matched along the entire connector length.

The reliability of the feed-through with a transition joint is typically very poor. Besides the difficulty of a good attachment during manufacture, these joints commonly fail upon thermal cycling. There are two recognized reasons. First, poor nickel and/or gold plating of the packages, feed-throughs and power connectors can result in excessive leaching of the plated metals during soldering, thereby inhibiting soldering. The second reason is mismatched expansion between the aluminum or aluminum alloy of the package and the feed-throughs and power connectors. The coefficient of thermal expansion of aluminum/aluminum alloys is approximately $22 \times 10^{-6}$ in/C/in vs that of cold rolled steel and stainless steel at approximately $12-18 \times 10^{-6}$ and iron-nickel alloys at approximately $7 \times 10^{-6}$. This mismatch in expansion during thermal cycling can create stresses which can result in the loss of the hermeticity and expensive rework and repeat of testing in these devices. In frequent situations upon multiple recurrence, the package becomes useless and is discarded.

Some progress has been made to develop connectors with aluminum bodies. D'Alessandro, in U.S. Pat. No. 3,685,005, issued on Aug. 15, 1972, describes a hermetically sealed connector made with an aluminum body. However, the connector is not designed for RF applications and does not meet the electrical impedance requirements to be able to be used in RF applications.

Viret et al., in U.S. Pat. No. 5,367,125, issued on Nov. 22, 1994, describe a hermetic connector consisting of an aluminum shell, a phosphate-based glass seal and a copper/beryllium connecting pin. The connectors described utilize a vitreous or glass material with a required modifying agent for increasing the working temperature range of the glass material. Various embodiments of the invention require pre-oxidation of the aluminum body in a toxic chromic acid bath and nickel-plating and pre-oxidation of the conducting Cu/Be pin. The embodiments are designed for electrical applications.

Some progress has been made in developing a glass that can be heremetically sealed to materials such as aluminum alloys. Brow et al., in U.S. Pat. No. 5,262,364, issued on Nov. 16, 1993, describe a glass composition for hermetically sealing to high-thermal-expansion materials such as aluminum alloys, stainless steels, copper, and copper/beryllium alloys.

The dielectric constant of the insulator material used to make any coaxial RF interconnection is important since the dielectric constant of the glass material, κ, technically derived from the electrical relative permittivity of the material, controls the electrical characteristic impedance of the interconnection.

The electrical Characteristic Impedance ($Z_0$) of a coaxial cylindrical geometry RF interconnection is inversely proportional to the dielectric constant and directly proportional to diameter of the interconnection, as given by the relationship, $$Z^0 (1/\sqrt{\kappa}) \log_{10} (D^i/d^o).$$

where:

$Z_0$ is the Characteristic Impedance of the geometry;

$\kappa$ is the dielectric constant of the insulator material;

$D^i$ is the inner diameter of the outer conductor;

$d^o$ is the outer diameter of the inner conductor.

Therefore, given a constant center conductor diameter and desired Characteristic Impedance (e.g., 50 ohms), a higher dielectric constant means that the outer connector must have a larger diameter and the overall size and weight of the RF connector will increase. Advantageous are therefore glasses that can be sealed to aluminum alloys and that have low dielectric constants.

To make a directly sealable and weldable, hermetic RF interconnection with aluminum bodies, an insulating glass is required that can be sealed to the aluminum at temperatures below the melting point of aluminum alloys, that have thermal expansion coefficients that can be matched to the electrically conductive center contact material, that can be impedance-matched to make a suitable RF connector, and that has high chemical durability, mechanical strength, and very low gas permeability. The melting point of typical aluminum alloys is about 550° C. compared to that of a conventional silicate glass which has a sealing temperature generally higher than about 1000° C. Furthermore, the thermal expansion coefficient of copper and copper-beryllium alloys preferred for high electrical conductivity pins is generally higher than that of conventional silicate glasses.

SUMMARY OF THE INVENTION

This invention provides a hermetically-sealed RF interconnection with an outer body or housing made of aluminum, a ferrous or nonferrous center electrical conductor, and an insulating glass that can be directly sealed or welded to the aluminum body and the center electrical conductor, and the method of making the RF interconnection.

One object of the invention comprises an aluminum-alloy housing and an insert mounted in a seating in the housing wherein the insert comprises a center electrical conductor surrounded by an aluminophosphate glass composition with the insert directly sealed onto at least one portion of the surface of the seating of the housing and wherein the glass composition comprises the compounds $Na_2O$, $K_2O$, $Al_2O_3$, $P_2O_5$, $B_2O_3$, and one or more metal oxide selected from the group consisting of BaO, PbO, CaO, and MgO, or a mixture thereof. An electrically-insulating, hermetically-sealed, RF interconnection extending through a housing of aluminum is obtained using an insert comprising a low-temperature sealing glass in which an electrically conductive pin is inserted. The invention directly seals between an aluminum housing and an electrically conducting center pin, thus bypassing the added processing step of making the steel/aluminum transition joint.

In one embodiment of the invention, the RF interconnection comprises a glass composition for hermetically sealing to aluminum or aluminum-alloy materials of between about 10 and about 25 mole percent $Na_2O$, between about 10 and about 25 mole percent $K_2O$, between about 4 and about 15 mole percent $Al_2O_3$, between about 35 and about 50 mole percent $P_2O_5$, $B_2O_3$ in a concentration not exceeding 10 mole percent, and MXO in a concentration not exceeding 12 mole percent, wherein MXO is a metal oxide selected from the group consisting of BaO, PbO, CaO, and MgO or a mixture thereof. Preferred is a glass composition where no PbO and no BaO is present.

In another embodiment of the invention, a cylindrical, hermetically-sealed, RF feed-through is made wherein the insert is sealed to a cylindrical aluminum or aluminum-alloy housing.

In another embodiment of the invention, an aluminum, hermetically-sealed RF connector is made with an industry-standard interface, e.g., a Sub-Miniature Series A (SMA) interface, or other common RF-connector interface, that has a suitable weld flange for subsequent welding into an aluminum housing.

In another embodiment of the invention, a hermetically-sealed, aluminum, RF interconnection is made with a glass composition with a dielectric constant less than 8 at a frequency of about 0 to about 1000 MHz.

The invention also relates to a method of implanting at least one insert into at least one seating in a housing consisting of a material containing aluminum. According to a general feature of the invention, the method of preparation of an RF interconnection comprises the steps of:

a) mixing amounts of $Na_2O$, $K_2O$, $Al_2O_3$, $P_2O_5$, $B_2O_3$, and one or more metal oxides selected from the group consisting of BaO, PbO, CaO, and MgO or a mixture thereof;

b) heating the mixture;

c) casting the melt into a mold as a glass rod, cooling the melt, and then annealing the cooled melt into a preformed glass rod;

d) coring the preformed glass rod and cutting the rod to length;

e) preparing an insert by placing a center conductor coaxially into the cored glass rod and sealing the conductor to the glass rod by heating;

f) sealing the insert to an aluminum housing by heating the insert and housing.

The capability to make these small assemblies results in an advantageous reduction in weight of electronic assemblies in which they are used. Additional advantages include the use of aluminum which is easier and faster to machine than steel as well as being less expensive. This invention also enables seals to be made using copper-alloy center conductors instead of traditional steel center conductors, such as beryllium/copper or aluminum/copper, sealed into steel housings, which results in improved electrical conductivity of the center conductor.

The insulating glass utilized in the invention has a sufficiently low dielectric constant to permit RF connectors to be produced with a variety of geometries and sizes and that has sufficiently high chemical durability and mechanical strength to have improved operating and shelf life and sufficiently low gas permeability to provide a long-term (i.e., greater than 10 years) hermetic seal.

Further advantages and characteristic features of the invention will become apparent from examination of the detailed description given hereinafter and from the appended drawings.

FIGURES

FIG. 3 shows an aluminum, hermetically-sealed coaxial, electrical RF feed-through.

DETAILED DESCRIPTION OF THE INVENTION

This invention provides a hermetically sealed RF connector or feed-through with an aluminum or aluminum-alloy housing and an insulating glass that can be directly sealed or welded to the housing. The invention comprises an aluminum housing and an insert mounted in a seating in the housing wherein the insert comprises a center conductor surrounded by an aluminophosphate glass composition with the insert directly sealed circumferentially onto at least one portion of the interior surface of the seating of the housing. The term "seating" as used herein refers to an opening in the aluminum housing, where the aluminum housing may be any aluminum or aluminum-alloy wall or body accommodating the insert. Generally, the implanting of a feed-through insert in a seating in a housing requires, prior to sealing, the 1) preparation of the insert and 2) preparation of the housing. These two stages may be carried out independently of each other in any order. The basic hermetic aluminum RF interconnection comprises an insert made of a solid, small diameter, cylindrically-shaped center electrical conductor, or pin, made of either ferrous material, such as steel, or non-ferrous material, such as a copper alloy and more particularly, a beryllium-copper or aluminum-copper alloy, surrounded by a low-melting-temperature, aluminophosphate, high-thermal-expansion sealing glass material according to this invention of a length shorter than the length of the center electrical conductor, with said insert sealed or fused directly into the seating or opening of an aluminum or aluminum-alloy housing.

Figure 1:
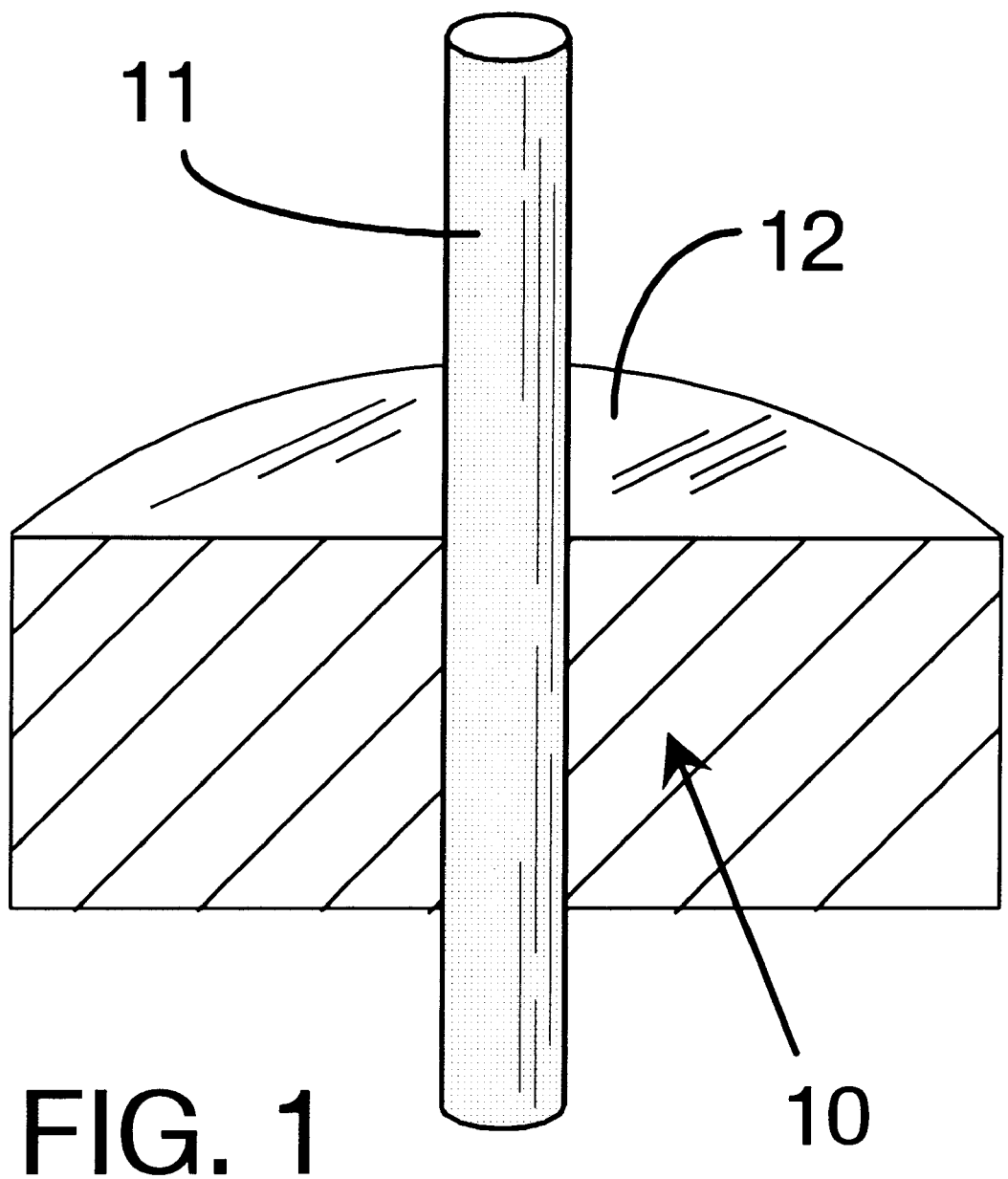
FIG. 1 shows an illustration of a glass-seal insert.

The general insert 10 is illustrated in FIG. 1, comprising a solid, small-diameter cylindrically-shaped center electrical conductor 11 made of either ferrous material, such as steel, or nor-ferrous material, such as a copper alloy, surrounded coaxially by a cylinder of low-melting-temperature, aluminophosphate, high thermal-expansion sealing glass material 12 according to this invention of a length shorter than the length of the center electrical conductor.

Figure 2:
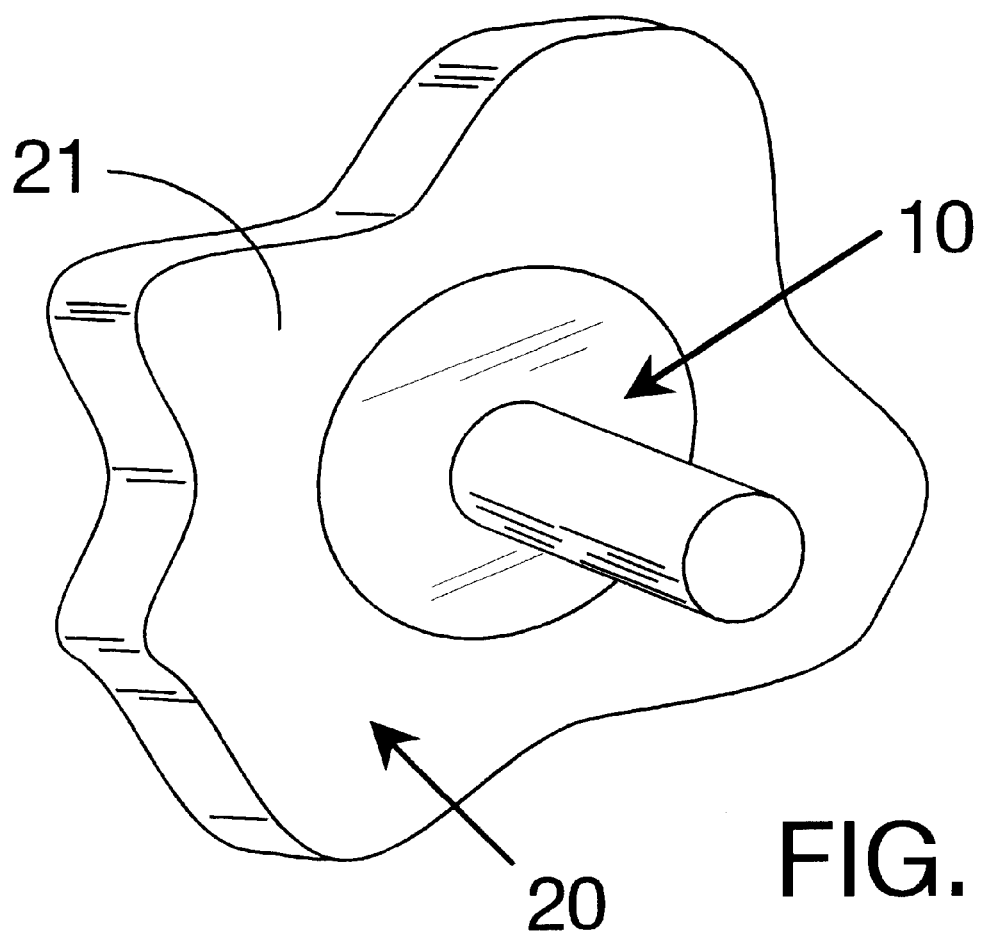
FIG. 2 shows an illustration of a general aluminum, hermetic, coaxial electrical RF feed-through interconnection.

The basic hermetic aluminum RF feed-through interconnection 20 as shown in FIG. 2, comprises an insert 10 that is sealed or fused directly into a seating of an aluminum or aluminum-alloy housing 21 of arbitrary geometry, thereby creating an RF feed-through with a hermetic seal.

Figure 3:
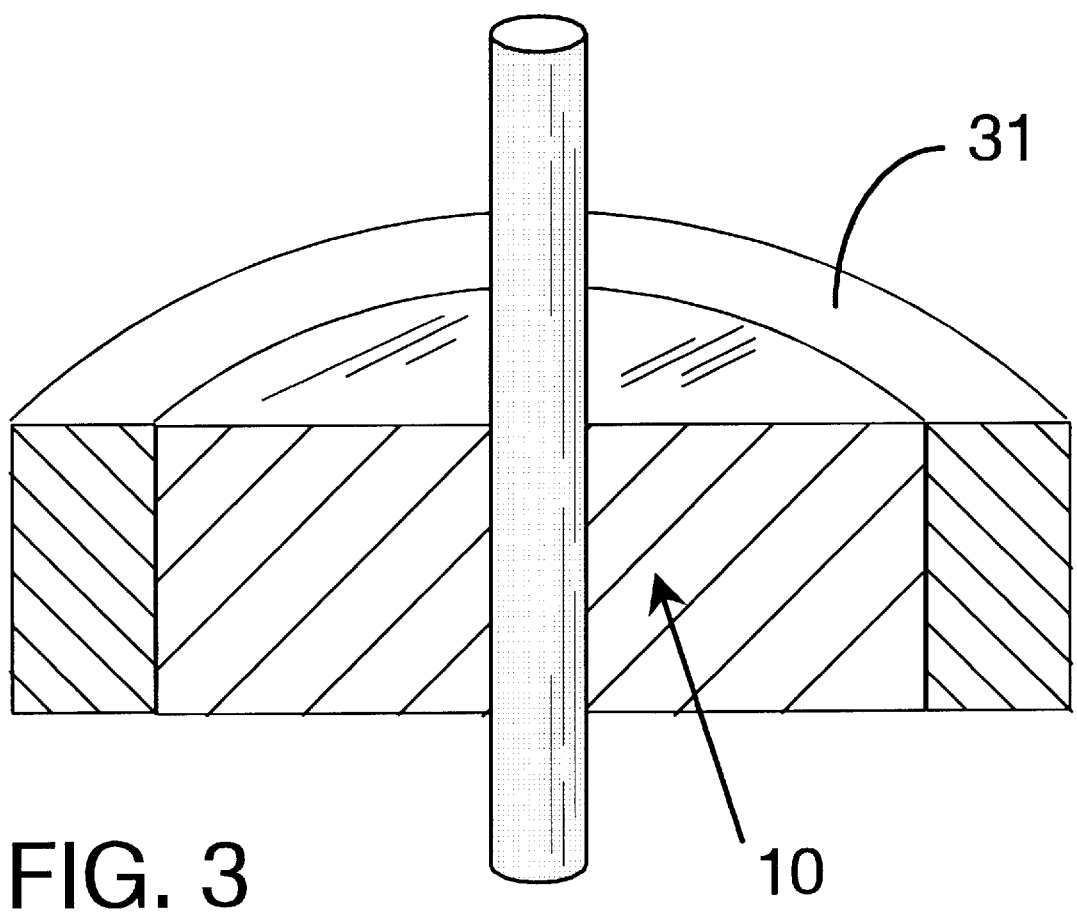

An aluminum, hermetically-sealed, cylindrical RF feed-through is made by sealing the insert 10 to an outer cylindrical aluminum or aluminum alloy cylindrical wall 31, as shown in FIG. 3. This cylindrical, coaxial RF feed-through is then suitable to be welded into an appropriate opening in a housing of a final electronic assembly.

Figure 4:
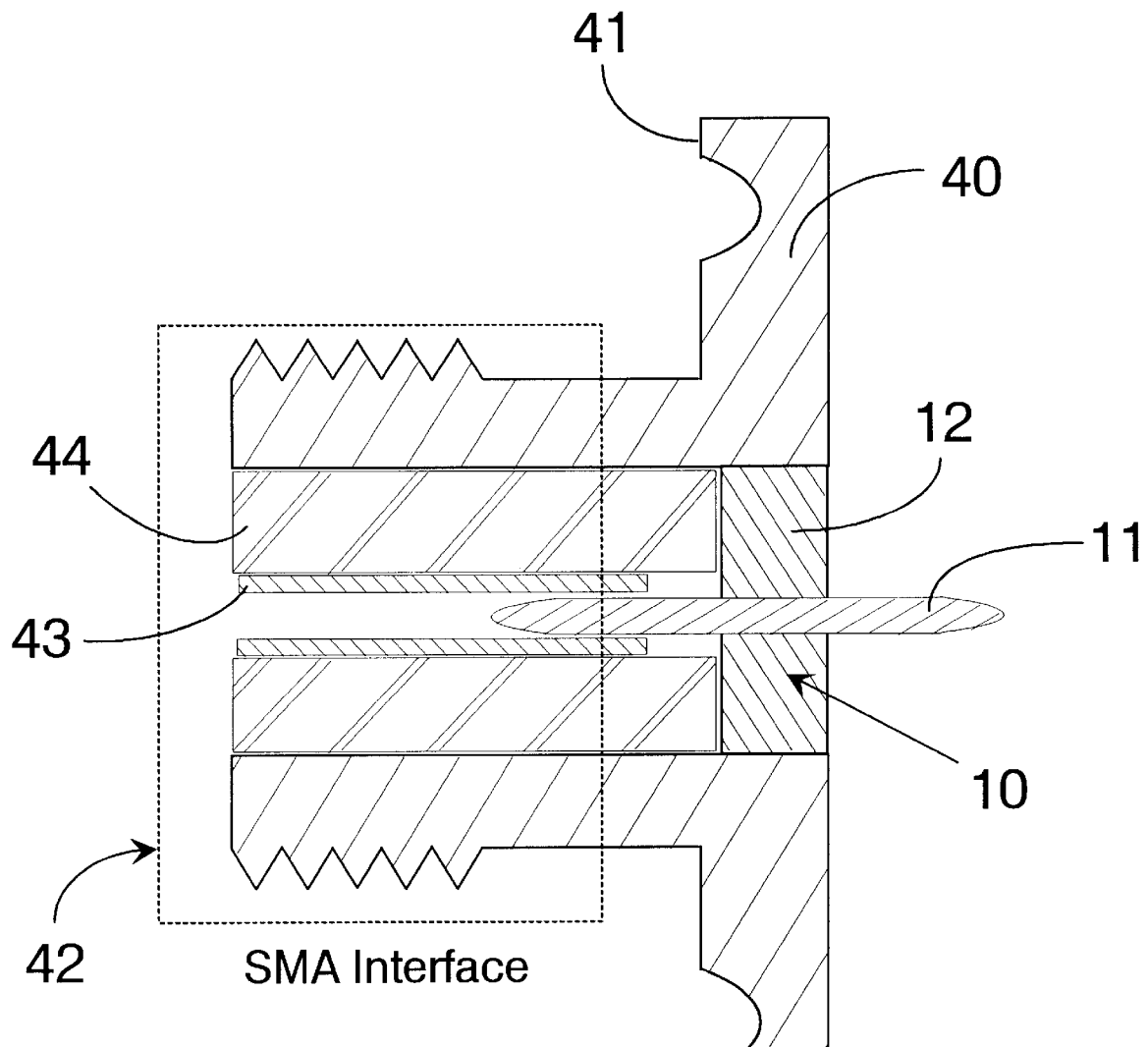
FIG. 4 shows an aluminum, hermetically-sealed, electrical RF connector.

An aluminum, hermetically-sealed RF connector with an industry-standard connector interface, e.g., a Sub-Miniature Series A (SMA) interface that has a suitable weld flange for subsequent welding into a housing can also be made, as shown in FIG. 4. The insert 10 with the center conductor 11 surrounded by the aluminophosphate glass 12 according to this invention is sealed to the aluminum RF connector body 40, wherein the body 40 has a flange 41 suitable for welding the RF connector to the housing of a final electronic assembly. The center conductor 11 makes electrical contact with the SMA interface 42 via an electrical socket contact 43. An approximately cylindrical insulating material 44 comprises a layer between the housing and the volume around where the center conductor makes contact with the interface.

With any of these configurations, or others as might be apparent to one skilled in the art, the aluminophosphate glass 12 is an important part of the invention because the glass can achieve a hermetic seal to the center conductor 11 and the various aluminum housing configurations to provide suitable physical, chemical, and electrical properties. The housing may be any high-expansion metal, such as steel or an aluminum alloy, but an important advantage in weight reduction is realized when a lighter-weight aluminum or aluminum-alloy housing is utilized.

Because the weight of an RF feed-through or interconnection is critical in many applications, an interconnection, feed-through or connector that utilizes light-weight aluminum-alloys, compared with heavier weight steel or other metals, is advantageous. An important part of the present invention is the high-thermal-expansion, alkali, aluminophosphate glass compositions for hermetically sealing to low-melting-temperature materials such as aluminum alloys. The glass compositions according to the present invention have suitable chemical durability, strength and gas-permeability characteristics but, importantly, have sufficiently low dielectric constants to enable the making of relatively small-diameter RF feed-throughs and connectors with low electrical Characteristic Impedance. The electrical Characteristic Impedance ($Z^o$) of a coaxial geometry RF interconnection is inversely proportional to the dielectric constant and directly proportional to the diameter of the interconnection; therefore, a glass with a lower dielectric constant permits a smaller diameter and lesser-weight connector assembly. The capability to make these small assemblies results in an advantageous reduction in weight of electronic assemblies in which they are used. Additional advantages include the use of aluminum which is easier and faster to machine than steel as well as being less expensive. This invention also enables seals to be made using copper-alloy center conductors instead of traditional steel center conductors, resulting in improved electrical conductivity of the center conductor. The use of beryllium-copper is typical for the center conductor but copper alloys not containing beryllium are advantageous because of the potential health hazards associated with beryllium. According to the present invention, RF interconnections can be made with dielectric constants of less than 8 at frequencies up to about 1000 MHz, resulting in interconnections with a characteristic impedance from about 25 ohms to greater than 300 ohms. The present invention can also be used in high voltage applications.

Suitable dissolution rates, in 70° C. deionized water, of between about $1 \times 10^{-6}$ and $2 \times 10^{-9}$ g/cm$^2$-min are desired and are achieved by the glass according to the present invention. Suitable strength and gas permeability values are also achieved, as evidenced by the invention meeting criteria for thermal shock and hermeticity leak checks. Typical hermetic seals with the present invention have leak rates less than about $10^{-9}$ cc-helium/sec and survive standard thermal shock tests (e.g., five cycles, −35° C. to +85° C.). Desirable glass thermal expansion coefficients are those that match pin materials, including copper alloys, such as beryllium-copper and aluminum-copper (viz., 16–19.5×10$^{-6}$/° C.). Glass transition temperatures under about 425° C. are desirable to ensure that hermetic seals can be made below about 525° C. Importantly, glass dielectric constants of less than 8, and more preferably, less than 7 are obtained, as measured at a frequency from about 10 MHz to about 1000 MHz at 20° C. These properties are required to provide proper impedance matching and stability. In general, the glass compositions comprise the following constituents: $Na_2O$, $K_2O$, $Al_2O_3$, $P^2O^5$, $B_2O_3$, and one or more metal oxide selected from the group consisting of BaO, PbO, CaO, and MgO or a mixture thereof. More particularly, each composition comprises between about 10 and about 25 mole percent $Na_2O$, between about 10 and about 25 mole percent $K_2O$, between about 4 and about 15 mole percent $Al^2O^3$, between about 35 and about 50 mole percent $P_2O_5$, $B_2O_3$ in a concentration not exceeding 10 mole percent, and MXO in a concentration not exceeding 12 mole percent, wherein MXO is a metal oxide selected from the group consisting of BaO, PbO, CaO and MgO or a mixture thereof. Preferred is a glass composition where no PbO and no BaO are present. Glass compositions with no PbO or BaO were found to provide the most advantageous dielectric constant while maintaining acceptable thermal expansion coefficient and dissolution rate values. Glass compositions without PbO or BaO are advantageous because of the potentially toxic hazard from those compounds. The use of MgO and CaO has been shown to reduce the dielectric constant of the glass without significantly affecting other desirable properties.

Some preferred compositions within the above component ranges are described in TABLE I. The corresponding properties of those compositions are listed in TABLE II. The compositions indicated here and those indicated hereinafter are given solely by way of nonlimitative examples.

A glass is prepared from a mixture of $Na_2O$, $K_2O$, $Al_2O_3$, $P_2O_5$, $B_2O_3$, and one or more metal oxide selected from the group consisting of BaO, PbO, CaO, and MgO or a mixture thereof, with initial quantities set to yield the final product. Glasses are prepared using standard

TABLE I

Compositions (mole %) of Example Aluminum Sealing Glasses According to the Present Invention

| Glass Designation | Glass Composition | | | | | |
|---|---|---|---|---|---|---|
| | $Na_2O$ | $K_2O$ | MXO | $Al_2O_3$ | $B_2O_3$ | $P_2O_5$ |
| ALSG-RF2 | 16.0 | 23.5 | 0.0 | 7.5 | 8.0 | 45.0 |
| ALSG-RF3 | 19.8 | 19.8 | 0.0 | 7.5 | 8.0 | 45.0 |
| ALSG-RF4 | 23.5 | 16.0 | 0.0 | 7.5 | 8.0 | 45.0 |
| ALSG-RF5 | 23.0 | 16.5 | 0.0 | 10.0 | 5.5 | 45.0 |
| ALSG-RF9 | 16.5 | 20.0 | 3.0MgO | 7.5 | 8.0 | 45.0 |
| ALSG-RF10 | 16.0 | 19.5 | 4.0CaO | 7.5 | 8.0 | 45.0 |
| ALSG-RF11 | 20.0 | 16.0 | 4.0CaO | 12.0 | 8.0 | 40.0 |
| ALSG-RF13 | 18.0 | 18.0 | 6.0CaO 6.0MgO | 12.0 | 6.0 | 42.0 |
| ALSG-RF15 | 16.0 | 9.8 | 4.0CaO | 7.5 | 8.0 | 45.0 |
| ALSG-RF16 | 13.2 | 13.2 | 0.0 | 7.5 | 8.0 | 45.0 |
| ALSG-27 | 15.0 | 22.0 | 2.8BaO | 7.5 | 8.0 | 45.0 |
| ALSG-32 | 15.0 | 18.0 | 9.0PbO | 12.0 | 6.0 | 40.0 | melt processing techniques. This mixture is calcined, then melted at approximately 1000° C. The melt is cast into molds, cooled, then annealed near the glass transition temperature. Examples of BaO- and PbO-free compositions are given in Table I.

This glass is cast generally as a solid glass rod, after which, centerless grinding is then used in the preparation of solid glass preforms for sealing experiments. These preforms are cored, then sliced to length. In addition, preforms can be made from glass powders that are pressed into appropriate geometries. RF interconnections with different center conductor pins were prepared.

TABLE II

Properties of Example Aluminum Sealing Glasses According to the Present Invention

| Glass Designation | Dielectric Constant, 1000 MHz, 20° C. | Thermal Exp. Coef., $10^{-7}/°$ C., RT-300° C. | $T_g$ (° C.) | Dissolution Rate, 70° C. $H_2O$, $g/cm^2$ min |
|---|---|---|---|---|
| ALSG-RF2 | 6.9 | 195 | 368 | $2.5 \times 10^{-7}$ |
| ALSG-RF3 | 7.0 | 191 | 382 | $6.3 \times 10^{-7}$ |
| ALSG-RF4 | 7.1 | 184 | 394 | $4.0 \times 10^{-7}$ |
| ALSG-RF5 | 7.3 | 179 | 415 | $2.5 \times 10^{-7}$ |
| ALSG-RF9 | 6.9 | 178 | 422 | $4.0 \times 10^{-7}$ |
| ALSG-RF10 | 6.4 | 190 | 415 | $4.2 \times 10^{-7}$ |
| ALSG-RF11 | 7.1 | 160 | 435 | $3.8 \times 10^{-7}$ |
| ALSG-RF13 | 7.1 | nm | nm | nm |
| ALSG-RF15 | 7.0 | 160 | 401 | nm |
| ALSG-RF16 | 6.9 | 176 | 388 | nm |
| ALSG-27 | nm | 175 | 408 | $3.2 \times 10^{-7}$ |
| ALSG-32 | 8.1 | 175 | 394 | $3.2 \times 10^{-9}$ | nm - not measured.

The RF interconnection configurations, as shown in FIG. 2, FIG. 3, and FIG. 4, consist of an axial-symmetric insert 10, with a conductor pin 11 (e.g., Cu/Be alloy A25) pin and an aluminum-alloy housing (e.g., alloy 5083, 5456, 6061, and 7000). These various RF interconnection configurations can be prepared using different conductor pins and different aluminum alloys. Typical test seals employ 0.010–0.040" diameter conductor pins and Al-alloy shells of 0.250" diameter center-conductor, 0.200" in length and with a 0.050" wall thickness. The Al shells and center conductor pins are cleaned using standard techniques. The glass and metal parts are cleaned using a standard detergent degreasing and cleaning process. The parts are sealed using fixtures machined from high density graphite (e.g., Poco DFP-1) or boron nitride. Seals are made in a nitrogen atmosphere using either a belt furnace or a batch furnace. A typical seal manufacturing profile consists of a ramp up at 10° C./min to 500° C., holding for thirty minutes, then cooling to 400° C., where the glass was annealed for about fifteen minutes before cooling to room temperature.

Seals are tested to ensure hermeticity to helium-leak rates of less than $10^{-9}$ cc/sec (helium) and to ensure survival of standard thermal shock tests (e.g., five cycles, $-35°$ C. to $+85°$ C.).

In one embodiment, a glass designated ALSG-RF4 was prepared from a mixture of $Na_2CO_3$, $K_2CO_3$, $Al_2O_3$, anhydrous $B_2O_3$, and $NH_4H_2PO_4$, with initial quantities set to yield the final product of 23.5% $Na_2O$, 16% $K_2O$, 7.5% $Al_2O_3$, 8.0% $B_2O_3$, and 45.0% $P^2O^5$, with the percentages in mole percent. This mixture was calcined at approximately 600° C. overnight, then heated in a platinum crucible to approximately 1000° C. Dry oxygen or air was bubbled through the melt at about 1000° C. for five hours, to ensure homogeneity and to reduce contamination by water. After an additional hour at 1000° C. for fining, the melt was cast into molds, cooled, then annealed at approximately 380° C. Other examples of BaO- and PbO-free compositions are given in Table I. A second, specific glass example, designated ALSG-RF9 (Table I), was prepared from the same starting materials, with the addition of MgO. The replacement of MgO by CaO produces other useful glasses.

This ALSG-RF4 glass was cast as a glass rod, 0.145" in diameter after centerless grinding, that was then used in the preparation of solid glass preforms for sealing experiments. These preforms are cored using a 0.042" diamond bit, then sliced to 0.150" lengths. RF interconnections with different center conductor pins, ferrous and non-ferrous, were also prepared.

For this embodiment, the RF interconnection configuration consisted of an axially-symmetric, cylindrical insert, as shown in FIG. 3, with a Cu/Be (e.g., alloy A25) pin and an aluminum alloy wall 31 (e.g., alloy 5083, 5456, 6061, and 7000). Various RF connector configurations were prepared using conductor pins and aluminum housings of different alloys. The configuration employed a 0.040" diameter center-conductor pin and the Al-alloy wall of 0.250" diameter, 0.200" length, and with a 0.050" wall thickness. The Al shells were cleaned using the R5 cleaning process (96% phosphoric acid, 4% nitric acid oxide etch, 190° F., 45 seconds) and the copper pins were cleaned in Brite Dip (74% acetic acid, 25% nitric acid, 1% hydrochloric acid, 20 seconds at room temperature; Be-containing pins were first immersed in HF acid for 10 seconds to remove surface Be-oxides). The glass and metal parts were cleaned using a standard detergent degreasing and cleaning process. The parts were fixtured using high density graphite (e.g., Poco DFP-1) or boron nitride, including a plunger. Two-gram weights can be used with the plunger to improve glass flow and adhesion during sealing. Seals were made in a nitrogen atmosphere using either a belt furnace or a batch furnace. A typical seal manufacturing profile consisted of a ramp up at 10° C./min to approximately 500° C., holding for thirty minutes, then cooling to approximately 400° C., where the glass was annealed for about fifteen minutes before cooling to room temperature. Seals have also been made using pressed powder preforms with similar dimensions.

The RF interconnections prepared achieved seals that were hermetic to leak rates of less than $10^{-9}$ cc/sec of helium, and survived standard thermal shock tests (e.g., five cycles, $-35°$ C. to $+85°$ C.). Similar procedures are used to make RF connectors with standard interfaces the only differences involve the nature of the metal parts.

The foregoing discussion discloses and describes only certain exemplary embodiments of the present invention. One skilled in the art will readily recognize from such discussion, and from the accompanying drawings and claims, that various changes and modifications can be made therein without departing from the spirit and scope of the invention as defined in the following claims.

We claim:

1. A hermetic radio-frequency (RF) interconnection comprising:

a housing having an opening therethrough which includes therein a seating surface; and an insert in said seating surface of said housing, said insert comprising a substantially cylindrical aluminophosphate glass composition surrounding an inner coaxial center conductor with the insert directly sealed onto at least one portion of the seating surface of the housing and to the inner center conductor, said aluminophosphate glass composition comprising between about 10 and about 25 mole percent $Na_2O$, between about 10 and about 25 mole percent $K_2O$, between about 4 and about 15 mole percent $Al_2O_3$, between about 35 and about 50 mole percent $P_2O_5$, $B_2O_3$ in a concentration not exceeding 10 mole percent, and MXO in a concentration not exceeding 12 mole percent, wherein MXO is a metal oxide compound selected from the group consisting of BaO, PbO, CaO, and MgO or a mixture thereof.

2. The interconnection of claim 1 wherein the glass composition comprises between about 10 and about 25 mole percent $Na_2O$, between about 10 and about 25 mole percent $K_2O$, between about 4 and about 15 mole percent $Al_2O_3$, between about 35 and about 50 mole percent $P_2O_5$, $B_2O_3$ in a concentration not exceeding 10 mole percent, and MXO in a concentration not exceeding 12 mole percent, wherein MXO is a metal oxide selected from the group consisting of CaO and MgO or a mixture thereof.

3. The interconnection of claim 1, wherein the housing comprises an aluminum-based material.

4. The interconnection of claim 1, wherein the inner center conductor comprises a ferrous material.

5. The interconnection of claim 1, wherein the interconnection is substantially radially symmetric about the center conductor.

6. The interconnection of claim 1, wherein the inner center conductor comprises a non-ferrous material.

7. The interconnection of claim 6, wherein the non-ferrous material is a copper alloy.

8. The interconnection of claim 1 wherein the interconnection has an electrical Characteristic Impedance between about 25 and about 300 ohms.

9. The interconnection of claim 1, wherein the interconnection is combined with a connector interface to form an RF connector.

10. The interconnection of claim 9, wherein the connector interface is a Sub-Miniature Series A (SMA) interface.

11. The interconnection of claim 1, wherein the glass composition has a dielectric constant of less than 8 measured at frequencies from about 0 to about 1000 MHz.

12. The interconnection of claim 1, wherein the glass composition has a dissolution rate of between about $1 \times 10^{-6}$ and $3 \times 10^{-9}$ g/cm$^2$-min.

13. The interconnection of claim 1, wherein said glass composition has a coefficient of thermal expansion in the range of between about $16.0 \times 10^{-6}$ and $20.0 \times 10^{-6}/°$ C.

14. A method of making an RF interconnection comprising:

mixing amounts of $Na_2O$, $K_2O$, $Al_2O_3$, $P_2O_5$, $B_2O_3$, and one or more metal oxides selected from the group consisting of BaO, PbO, CaO, and MgO or a combination thereof to form a mixture;

heating the mixture to form a melt;

casting the melt into a mold as a glass rod, cooling the melt, and then annealing the cooled melt into a preformed glass rod;

coring the preformed glass rod and cutting the rod to length;

preparing an insert by placing a center conductor coaxially into the cored glass rod and sealing the conductor to the glass rod by heating; and sealing the insert to an aluminum housing by heating the insert and housing.

* * * * *